United States Patent [19]

Miller, Jr. et al.

[11] Patent Number: 4,628,743

[45] Date of Patent: * Dec. 16, 1986

[54] APPARATUS AND METHOD FOR METERING SUB-10 CC/MINUTE LIQUID FLOW

[75] Inventors: Theodore E. Miller, Jr.; Hamish Small, both of Midland, Mich.

[73] Assignee: The Dow Chemical Company, Midland, Mich.

[ * ] Notice: The portion of the term of this patent subsequent to Aug. 6, 2002 has been disclaimed.

[21] Appl. No.: 738,125

[22] Filed: Jun. 14, 1985

Related U.S. Application Data

[63] Continuation of Ser. No. 280,668, Jul. 6, 1981, Pat. No. 4,532,811.

[51] Int. Cl.[4] ........................... G01F 1/68; G01F 1/70; G01P 5/18
[52] U.S. Cl. .................................. 73/861.05; 73/204
[58] Field of Search ............................. 73/204, 861.05

[56] References Cited

U.S. PATENT DOCUMENTS

| | | | |
|---|---|---|---|
| 2,509,889 | 5/1950 | Shockley | 73/204 X |
| 2,586,060 | 2/1952 | Kronberger | 73/204 |
| 2,603,039 | 7/1952 | Morley et al. | 73/204 |
| 2,724,271 | 11/1955 | Shawhan et al. | 73/204 |
| 2,776,565 | 1/1957 | Hudson | 73/204 |
| 2,799,165 | 7/1957 | Varvel | 73/204 |
| 2,813,237 | 11/1957 | Fluegel | 73/204 |
| 2,947,938 | 8/1960 | Bennett | 324/62 |
| 3,199,348 | 8/1965 | Salera | 73/204 |
| 3,220,255 | 11/1965 | Scranton et al. | 73/204 |
| 3,335,606 | 8/1967 | Scarpa | 73/204 |
| 3,399,566 | 9/1968 | Brown | 73/861.05 X |
| 3,425,277 | 2/1969 | Adams | 73/204 |
| 3,452,595 | 7/1969 | Auger | 73/204 |
| 3,595,079 | 7/1971 | Grahn | 73/204 |
| 3,597,676 | 8/1971 | Moore | 323/20 |
| 3,645,133 | 2/1972 | Simeth et al. | 73/204 |
| 3,781,839 | 12/1973 | Bodge | 73/204 |
| 3,820,393 | 6/1974 | McGunigle | |
| 3,922,912 | 12/1975 | Bradbury et al. | 73/204 |
| 3,987,788 | 10/1976 | Emil | 73/204 |
| 4,043,195 | 8/1977 | Hunting | 73/204 |
| 4,059,982 | 11/1977 | Bowman | 73/204 X |
| 4,228,683 | 10/1980 | Juffa et al. | 73/204 |
| 4,228,815 | 10/1980 | Juffa et al. | 73/204 X |
| 4,237,730 | 12/1980 | Feng | 73/204 |
| 4,458,709 | 7/1984 | Springer | 73/861.05 |
| 4,532,811 | 8/1985 | Miller, Jr. et al. | 73/861.05 |

FOREIGN PATENT DOCUMENTS

| | | |
|---|---|---|
| 14943 | 6/1976 | Australia . |
| 6079380 | 1/1981 | Australia . |
| 814147 | 6/1969 | Canada . |
| 1084653 | 9/1967 | United Kingdom . |
| 1095476 | 12/1967 | United Kingdom . |

OTHER PUBLICATIONS

Briggs-Smith et al., "Pulsed Thermistor Technique for Measuring Low Liquid Flow Rates", in Rev. Sci. Inst. 52(10) 1981, pp. 1565-1568.

Manual for the Knauer Electronic Volumeter entitled "Instructions/Knauer Electronic Volumeter", Type 68.00 for Flow-Through Volume Measurement (and Including Cover Letter of the Utopia Instrument Company dated 3/24/80).

Abstract No. 34 from the 1979 Pittsburg Conference entitled "Precise Measurement of Flow Rate in Liquid-Chromatography: The Electronic Volumeter".

*Primary Examiner*—Herbert Goldstein

[57] ABSTRACT

Apparatus for accurately metering liquid flow based on the injection of a brief heat pulse into the flowing stream, e.g., via a miniature thermistor, and detection of an electronic time derivative of temperature downstream with, e.g., a second microprobe thermistor. This detection triggers a subsequent heat pulse and the cycle repeats, with pulse total corresponding to elapsed liquid throughput, and pulse frequency to flow rate.

8 Claims, 4 Drawing Figures

APPARATUS AND METHOD FOR METERING SUB-10 CC/MINUTE LIQUID FLOW

This is a continuation of application Ser. No. 280,668, filed July 6, 1981, now U.S. Pat. No. 4,532,811.

BACKGROUND OF THE INVENTION

In order to determine molecular weight or size distribution of separated particles in GPC (Gel Permeation Chromatography) and HDC (Hydrodynamic Chromatography), peak composition is inferred from its elution volume. Elution volume has been determined in chromatography by measuring the transit time of unretarded marker species to which the detector is sensitive and ratioing solute position to marker position. Use of a marker is quite typical since even premium quality liquid chromatographic pumps are generally not capable of better than 0.3% flow stability over repeated analyses. For this reason, the practice of assuming constant flow and measuring elution time would frequently result in unacceptable uncertainties in the determination of latex particle diameters as an illustrative example.

Another flow related source of error for concentration-sensitive detectors (UV, IR, RI, Conductivity) in LC is the inverse proportionality between peak area and flow rate, e.g., a 0.5% flow decrease produces a 0.5% area increase.

The most troublesome flow fluctuations are those with periods on the order of peak widths since these cause individual peak areas to change. Such fluctuations can occur, e.g., with reciprocating piston pumps because check valve leakage rates tend to change for subsequent pump strokes, and stroke volumes are typically 50 to 500 $\mu$l.

Present methods for measuring elapsed flow include collecting a volume of eluent in a graduated cylinder, measuring the movement of a bubble injected into the flowing liquid, or accumulating the total number of dumps of a siphon dump counter, all techniques which can be somewhat imprecise or erratic.

Other classical flow measuring devices, generally for higher ranges, include the following:
1. Coriolis flow meter, measures mass flow as a function of gyroscopic torque forces. This method is complex and expensive; accuracy is ±0.4%.
2. Ultrasonic flow meter, suited for gallons-per-minute flow; accuracy is ±0.5%.
3. D/P flow cell, measures pressure drop across an orifice. Prone to plugging, drift; viscosity dependent.
4. Turbine meter, target meter, venturi meter, rotameter, Pitot tube, all principally applicable to flow rates in excess of 50 cc/min.
5. Continuous heat addition flow meter, heats eluent and measures downstream temperature continuously. Result varies with the specific heat of the metered liquid and ambient temperature fluctuations.
6. Self-heating thermistor, undergoes cooling proportional to flow. Nonlinear and result varies with specific heat of solution and ambient temperature variations.

THE INVENTION

The invention relates to a non-invasive liquid metering method and apparatus for determining liquid movement with an attainable precision of ±0.1% under typical LC conditions. The invention particularly satisfies the technical need for an improved liquid metering method and apparatus for accurately metering liquids in the 0.1 to 10 cc/minute range where metering precision becomes extremely important.

The inventive method and apparatus uses the principle of injecting a heat pulse into the flowing stream via, e.g., a miniature self-heating thermistor (or semiconductor) and detecting the pulse downstream with, e.g., a second microprobe or fast response thermistor. Pulse detection triggers a subsequent heat pulse upstream and the process repeats, with pulse total corresponding to elapsed liquid throughput and pulse frequency to flow rate.

Salient keys to achieving this technical advance in flow metering include particularly:
1. minimizing the thermal mass of the heat "pulser" and sensor through the application of semiconductor pulsing and sensing elements;
2. electronically time-differentiating the sensor output to reject characteristically slower ambient thermal drift and to minimize response time in preparation for subsequent pulse detection;
3. application of a flow metering scheme which uses an improved method for high precision flow measurements and flow cell calibration; and
4. development of a flow cell and method, which by component selection and operation, is highly independent of temperature and liquid composition variables.

While the general principle of heat pulse injection is not entirely new to liquid metering, being applied previously in the form of what is known as "Knauer Electronic Volumeter" distributed through Utopia Instrument Company, Joliet, Ill., none of the recited technical improvements (1-4) are embodied in this prior liquid meter. Among major expressed differences in utility between the invention and the prior meter, as taken from the manufacturer's literature, is the development of a successful two-probe metering flow cell (Knauer teaching utility only with respect to a 4 probe device); as well as the extended utility to meter aqueous solvents, a field of utility disclaimed in the manufacturer's literature.

SUMMARY OF THE INVENTION

The invention as it relates to an electronic flow cell for accurately metering liquid, more specifically comprises in combination:
(a) a flow cell having a flow-through passage;
(b) a resistance heat means comprising a semiconductor element, the resistance heating means having a heat emitting surface which is exposed in the flow passage; and
(c) a heat sensing thermistor, the heat sensing thermistor having a heat sensing surface exposed in the flow passage in fixed, spaced relationship with the heat emitting surface of the resistance heating means.

The invention as it relates to the inventive flow cell, together with the electronic circuit to operate same, comprises in combination:
(a) a flow cell having a flow through passage;
(b) a resistance heating means comprising a semiconductor heating element, and circuit means to operate the semiconductor element as a resistance pulse heater, the resistance heating means having a heat emitting surface which is exposed in the flow passage;

(c) a heat sensing thermistor, and circuit means to operate the thermistor in the heat sensing mode, the heat sensing thermistor having a heat sensing surface which is exposed in the flow passage in fixed, spaced relationship with the heat emitting surface of the resistance heating means;

(d) a differentiating circuit means for outputting an electrical pulse signal which in magnitude is proportional to $dR_t/dt$, or a time derivative thereof, wherein $dR_t/dt$ is the time rate of change of the resistance of the heat sensing thermistor with pulse temperature changes in the liquid to be metered;

(e) said circuit means operating the resistance heating means comprising a timer circuit means which is activated directly or indirectly by each event of a sensible outputted pulse of circuit means (d), to apply a timed voltage pulse to the resistance heating means.

The invention further relates to an improved method for electronically metering the flow of Newtonian liquids which comprises:

(a) conveying the liquid to be metered through an electonic flow cell having a predetermined calibrated cell volume ($V_c$) and calibrated time constant (K);

(b) inputting uniformly timed heat pulses into the conveyed liquid and detecting the pulses downstream, and wherein each detection event triggers the input of a timed heat pulse to produce the condition of pulse frequency being related to liquid flow rate (f);

(c) electronically detecting the period (T) between pulses; and (d) determining a measure of flow of the metered liquid based on the application of the relationship, $$T = (V_c/f) + K$$

Optimum forms of the apparatus invention use a self-heating thermistor as the heat pulsing element, in conjunction with a fast response thermistor as the heat sensor, each of which includes an electrical insulator, e.g., of glass, which encapsulates the semiconductor thermistor element thereof. In addition, not less than the second time derivative of the resistance of the heat sensing thermistor is taken and used as the signal to pulse the self-heating thermistor.

In respect to the inventive method, other known forms of electronic flow cells (i.e., "flow cells", the metering principle of which is based on the time of flight of electronically injected heat pulses) can be operated by the method to produce an improved measure of flow. The optimum form of practice of the method invention uses the inventive electronic flow cell. The term Newtonian liquids as used in the method terminology refers to a liquid, the viscosity of which at the metered flow condition is substantially constant.

While the invention has been described with regard to applications where actual data is desired to show, as a measure of flow, instantaneous or averaged flow rate or total flow volume with time, the invention can additionally be applied in the form of a control method or instrument, e.g., to regulate a chromatographic or other liquid metering pump, e.g., by continually detecting flow rate and relaying a signal (measure of flow) to the pump to adjust its flow to a metered setting. It is also apparent that while the major expressed technical need is for improved apparatus and method to meter flow in the sub-10 cc/minute range, the principles of the invention are extendable to measuring a considerably higher range of flow rates as Example 3 demonstrates below.

DRAWING

Yet further features and advantages of the invention will be apparent from the "Detailed Description of the Invention", below, taken with the accompanying drawing wherein.

DETAILED DESCRIPTION OF THE INVENTION

Figure 1:
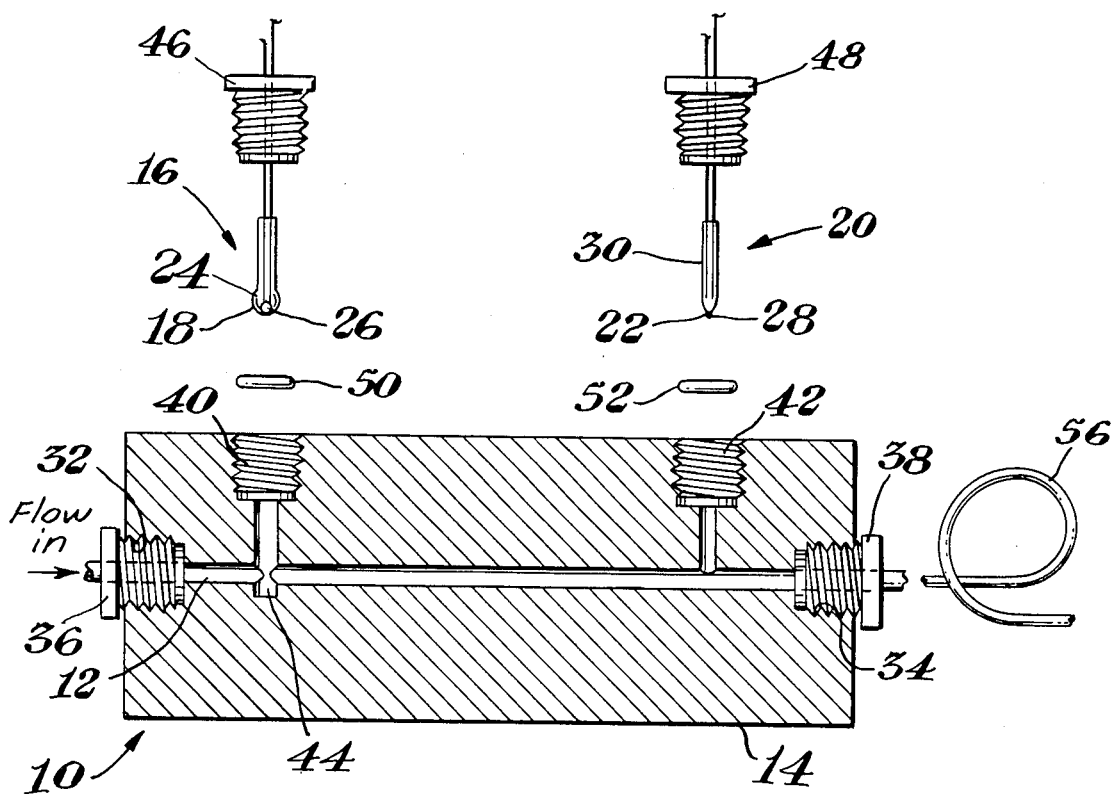
FIG. 1 is an exploded, partly cross-sectioned view of a preferential flow cell design for metering liquid according to the principles and teachings of this invention.
Figure 2:
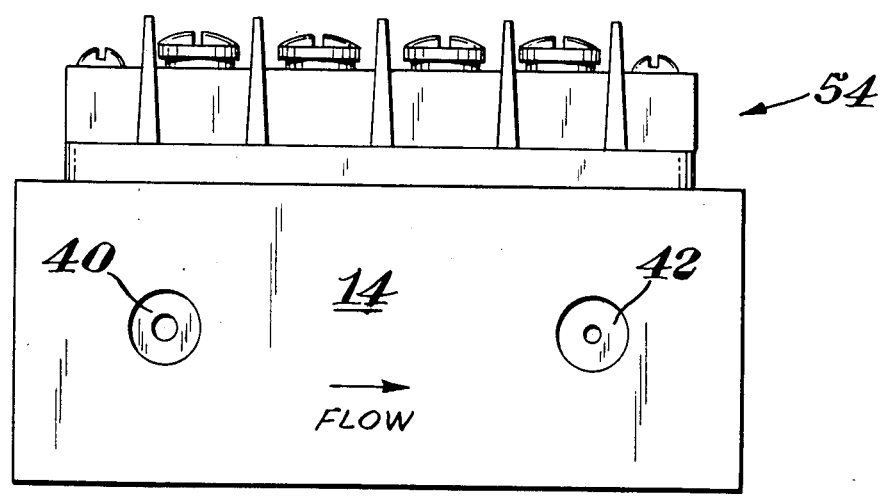
FIG. 2 is a top view showing the cell body of the FIG. 1 flow cell.

Referring to FIGS. 1 and 2, a preferred embodiment of the apparatus of the invention is illustrated comprising an electronic flow cell 10 for accurately metering milliliter liquid movement (herein meaning the range of about 0.1 to 10 cc/min). Flow cell 10 comprises a narrow flow-through channel or passage 12 through which the liquid to be metered is flowed. The size or internal volume of the flow cell (calibrated) is fixed and within the range of from between about 0.01 to 0.5 cc, preferably about 0.1 to 0.25 cc.

Mounted fixedly in the body 14 of flow cell 10 is a thermistor 16 (or its equivalent as described hereinafter) which is designed to be used in the self-heating mode to impart brief, sensible heat pulses to the liquid to be metered. The self-heating thermistor is comprised of a heat emitting surface 18 which is exposed to the flow channel for making direct flow contact with the liquid to be metered.

Spaced a fixed distance from the self-heating thermistor is a preferably smaller mass thermistor 20 which, in relative terms, is a fast response thermistor designed for use in the heat sensing mode. The heat sensing thermistor is comprised of a heat sensing surface 22 which is stationary and exposed in flow channel 12, also for making direct flow contact with the liquid to be metered (downstream from the self-heating thermistor).

Preferentially used for the self-heating thermistor is what is referred to as a "standard probe" thermistor, various commercial types of which are described in the trade publication entitled "Thermistor Manual" (Copyright 1974; and also bearing the identifying code number "EMC-6"), this publication being available from Fenwall Electronics, Framingham, Mass., and being incorporated fully herein by reference.

These standard probe thermistors are characteristically available in the desirable form comprising a glass bulb or probe, given Reference Numeral 24 in the drawing, and which comprises the heat emitting surface of the thermistor. Encased in the glass probe is a semiconductor element 26 which is thus protected and electrically insulated from direct contact with the liquid to be metered. The glass encased semiconductor element or probe 24 of this preferential thermistor type measures 0.100" in diameter. It can be used to develop approximately 50–150 milliwatts peak power over extended use periods without apparent deterioration or alteration of its electrical properties. Its small thermal mass, indicated by its Time Constant rating (T.C.) in air of between about 14–22 seconds is found generally sufficient to permit rapid enough pulsing in liquid to be suited for application to the invention; and its power output sufficient to develop sensible heat pulses in conjunction with the heat sensing capability of thermistor 20.

Preferentially selected as the heat sensing thermistor 20 is what Fenwall refers to as its "fast response" glass probe thermistor, also comprised of a semiconductor element 28 encased in a glass bulb or probe 30. These thermistors, due to a much smaller thermal mass, have a T.C. rating in air of about 5 seconds or less.

The commercial heat sensing thermistors described generally have a 3–4 percent/°C. negative temperature coefficient. This range of sensitivity has been found quite suitable for use in the invention. A lesser temperature coefficient for the heat sensing thermistor would be operable so long as sufficient resistance change is registered to sense the heat pulses in the liquid.

As should be readily apparent, the temperature coefficient of the self-heating thermistor is largely an unimportant parameter since this thermistor is used in the self-heating mode; it being preferred, however, to use a self-heating thermistor with a negative temperature coefficient to minimize possible thermistor damage due to inadvertent excessive heating, e.g., in the event the apparatus is abused or operated improperly. Either a negative or positive temperature coefficient thermistor may be equivalently used as the heat sensing thermistor.

As mentioned previously, the invention contemplates equivalents to the self-heating thermistor. These would be based on the substitution for thermistor element 16, of a semiconductor based heating element which differs in that it does not possess the temperature coefficient property which characterizes a thermistor element. The term "semiconductor" is intended to define a material which has a resistivity in the range of about $10^3$ to $10^{13}\mu$ ohm-centimeters, most preferably, about $10^4$ to $10^6\mu$ ohm-centimeters. Marginally useful as element 26 are resistance heating elements, the resistivity of which falls within the transition range between conductors and semiconductors, i.e., from about 750–1000$\mu$ ohm-centimeters. The term "semiconductors", as used in this disclosure, is by definition intended to include such latter materials having a resistivity within the defined transition range (e.g, certain carbon based materials); and which may be suitably fabricated into resistance heating elements useful for the purposes of the invention.

CELL FABRICATION

As can be readily appreciated, a very advantageous feature of flow cell 10 is its simplicity in design and fabrication. A preferred flow cell is constructed using a machinable block of glass filled Teflon ® to fabricate cell body 14. Ordinary drilling methods may be used to define flow channel 12. In addition, threaded openings 32, 34 are tapped at each end of the cell body for attaching chromatographic tube end fittings 36, 38 for passing liquid to be metered through flow channel 12; and similar threaded openings 40, 42 are tapped in the cell body at positions normal to the flow channel for threadably mounting the thermistors 16, 20, respectively.

Due to the relatively large size of the self-heating thermistor, a small depression 44 is sunk in cell body 14 immediately below the lower tip of heat emitting surface 18. The depression permits the heat emitting surface of the self-heating thermistor to be adjustably moved for centering on the axis of flow channel 12 for alignment with heat sensing surface 22 of the heat sensing thermistor (which is similarly desirably centered on the axis of the flow channel). Where relative dimensions require, the flow channel can be enlarged at the position of either or both thermistors 16, 20 to produce a coaxial step enlarged cavity in which the heat emitting and heat sensing surfaces of the thermistors are placed in centering alignment with the axis of the flow channel. The flow channel between the thermistors is correspondingly relatively small in diameter, to produce a flow cell of correspondingly small (calibrated) volume. The small size flow cells are also beneficially fabricated by mounting thermistors 16, 20 on opposite sides of cell body 14 whereby, through the offset, a closer spacing and thus shorter flow channel length dimension can be defined using essentially the same flow cell design as illustrated in the drawing.

A preferred arrangement for threadably affixing thermistors 16, 20 in cell body 10 employs hollow threaded plugs 46, 48, preferably of plastic, through which the electrical lead wires of the thermistors 16, 20 are passed. Elastic O-rings 50, 52, suitably of Kalrez ®, are seated in threaded openings 40, 42, respectively, and compressed to form a liquid tight seal about the glass thermistor body of each thermistor. A terminal strip 54 is attached, e.g., by machine screws, to the cell body. The lead wires of the thermistors are fastened, e.g., by standard electrical contact screws, to the terminal strip.

Obviously, considerable variation in this simple cell design is possible without changing it functionally. For example, the cell body may be composed of several joined components (as opposed to the unitary block construction shown). In addition, the cell flow channel may be defined using, e.g., a narrow diameter plastic tube (an embodiment described in the teaching Example 3, below).

FLOW RESTRICTOR

A flow restrictor or restrictor means 56 is connected by chromatographic tube end fitting 38 to the outfeed port or opening 34 of flow cell 10. The flow restrictor suitably comprises an appropriate length of capillary tubing which restricts flow to produce back pressure sufficient to avoid minute degassing of the metered liquid. The flow restrictor is beneficially used whenever the flow cell is located in a position of insufficient back pressure to avoid detrimental degassing phenomena. Any alternative device such as a common restrictor valve may be equivalently substituted for the illustrated capillary tube. The use of the flow restrictor, while optional, produces optimum levels of liquid metering precision in combination with flow cell 10 when used, e.g., to monitor chromatographic column effluent flow (where characteristically low back pressure leads to deterimental degassing of the metered liquid).

ELECTRONICS

Figure 3:
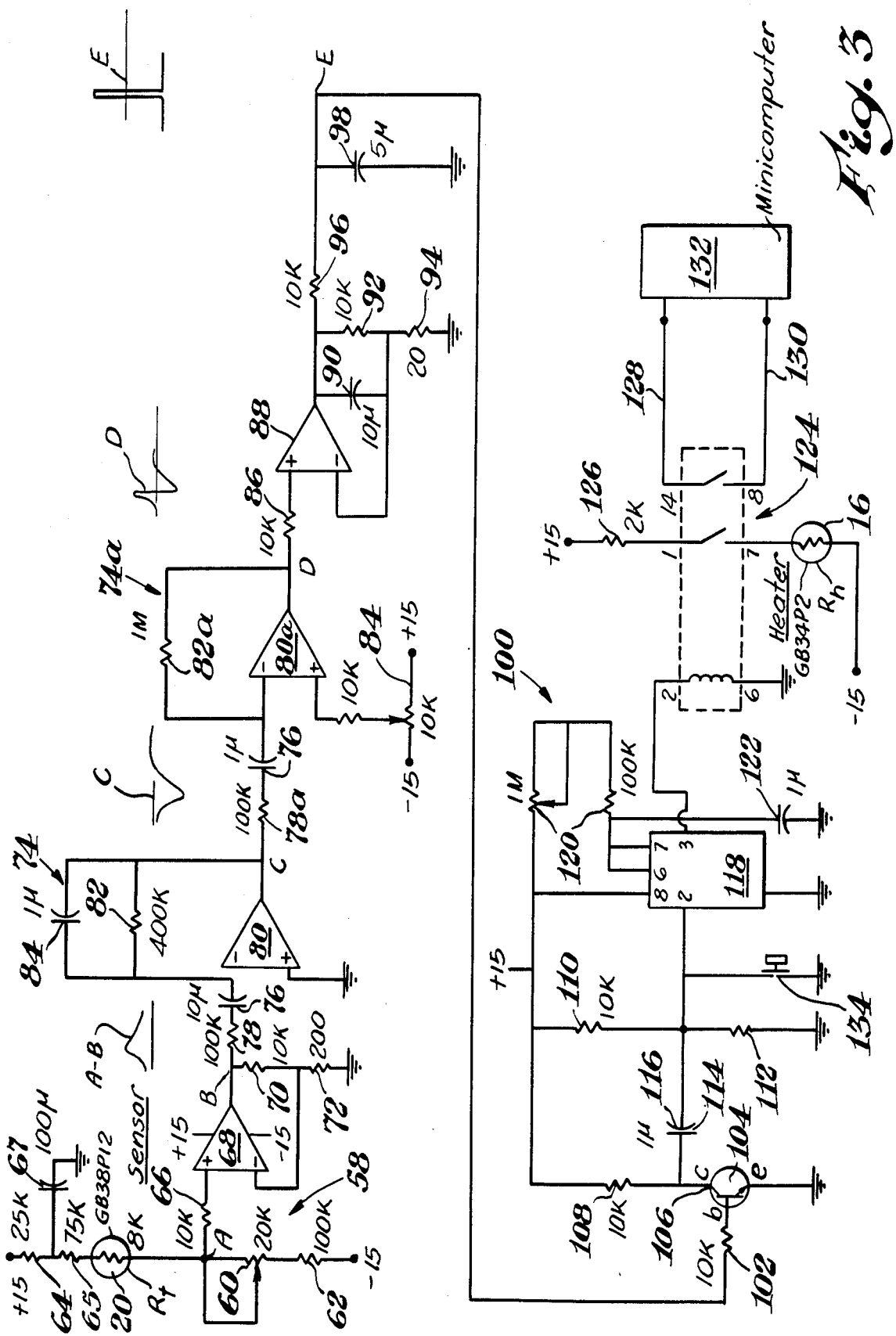
FIG. 3 is a schematic of a preferred electronic circuit for operating the flow cell according to the principles of the method of the invention.

A preferred design of an electronic circuit for operating flow cell 10 is shown in FIG. 3 and comprises circuit means 58 for operating thermistor 20 in the heat sensing mode. Circuit means 58 comprises a standard voltage divider circuit consisting of a potentiometer 60 and a series resistor 62 divided at juncture A from thermistor 20 and series resistors 64, 65. The total resistance of the circuit is sufficient to produce negligible current pulse surges due to pulse resistance decreases of the thermistor, and hence, non-detrimental self-heating of the heat sensing thermistor. The terminals of a common power source are connected across the voltage divider circuit to provide energizing voltage within the equilibrium range of thermistor 20. A capacitor 67 stabilizes the voltage at juncture A from rapid transients in the positive voltage supply level.

Pulse temperature changes in the metered liquid are electronically sensed in the form of positive-going voltage pulses which are proportional to the resistance change of thermistor 20 with temperature (this circuit being designed for and assuming the use of a negative temperature coefficient heat sensing thermistor). The outputted voltage pulses pass through a series current limiting resistor 66 and are amplified by a non-inverting, e.g., conventional type 741, operational amplifier 68, set for a gain of 50 by the selected ratio of resistors 70, 72 which are set in a voltage divider circuit mode on the negative feedback of amplifier 68 (in the standard arrangement). An approximate pulse wave form of the pre-amplified and amplified voltage pulse is shown in Inset A-B. This pulse is fed to a preferably two stage differentiating amplifier circuit or circuit means 74, 74a. First stage 74 of the differentiating circuit comprises a capacitor 76 in series with a current limiting resistor 78 and connected to the inverting input of, e.g., preferentially a type 741, operational amplifier 80. A feedback resistor 82 returns the input to zero following each inputted pulse signal. A capacitor 84 is connected in parallel with resistor 82 to filter high frequency ambient electrical noise.

The outputted pulse signal of amplifier 80 is both inverted and proportional to the time rate of change of the inputted voltage pulse (of Inset A-B), an approximated wave form of the outputted and derivatized pulse being shown in Inset C. Since the amplified Inset A-B voltage pulse is proportional to the electrically sensed resistance of the heat sensing thermistor, the outputted pulse (Inset C) is thus equivalently considered as the amplified time rate of change (or first time derivative) of the resistance change of thermistor 20 with pulse temperature changes in the metered liquid.

The time rate of change pulse signal is inputted to the second stage 74a of the differentiating circuit, which consists of the common elements (with amplifier 80) given like reference numerals. Additionally, the non-inverting input of the second stage amplifier 80a is provided with a zero adjustment biasing circuit 84 which is connected to the referenced power supply outputs in order to trim output of the voltage pulse signal of amplifier 80a. An approximate form of the amplifier 80a pulse signal is shown for exemplary purposes in Inset D; and is the amplified, electronically derived, second time derivative of the resistance of the heat sensing thermistor 20 with pulse temperature changes in the metered liquid.

The second derivative voltage pulse is fed through a current limiting resistor 86 to the non-inverting input of, e.g., suitably a type 741 operational amplifier 88. Amplifier 88 is connected to a capacitor 90 and resistors 92, 94 to produce high gain amplification with additional high frequency filtering. An outputted voltage pulse amplified, e.g., 500 times, is generated by amplifier 88 and filtered through a low pass filter consisting of a resistor 96 and capacitor 98 connected to the power supply common. The total amplification and derivatization functions produce a square wave curve or voltage pulse form which is shown in Inset E.

The voltage pulse of Inset E is fed to a timer circuit means 100 for pulsing the self-heating thermistor, and which includes a current limiting resistor 102, connected to the base of a switching transistor 104, suitably a standardized Part No. 2N3904. Transistor 104 switches its collector terminal 106 from +15 volts (power supply level) to zero upon arrival of the output of each Inset E voltage pulse. With each such triggering of the collector terminal, a voltage pulse from +15 to zero is produced.

The collector terminal at rest is biased at +15 volts by a voltage divider circuit consisting of a resistor 108 and the switching transistor. A second voltage divider 110, 112 produces a highly positive voltage at rest. The two voltages are placed across a capacitor 114 such that the capacitor is at an elevated voltage on both plates. The switching of the collector terminal voltage rapidly reduces the voltage at capacitor 114, whereby capacitor plate 116 is pulled to zero briefly until the second voltage divider returns to the rest voltage. Consequently, the voltage pulse width generated at the collector terminal is reduced to a voltage spike, which is fed to pin #2 of, e.g., suitably a type 555 timer 118. Pin #2 of the timer is the time cycle reset pin. The timer outputs a voltage pulse at pin #3, the duration of which is determined by an external variable resistor 120 in combination with an external capacitor 122 connected to pins #6 and #7 of timer 118. The setting is adjustably changed in this circuit between the limits of 0.1 to 1.0 second. Pins #1 and #8 are connected to common and the +15 volts power supply, respectively.

An outputted voltage of fixed duration is fed from pin #3 to a relay 124, e.g., suitably a DIP reed relay, which is a double pole, single throw relay which completes the contact between the power supply, a series resistor 126, and the heating thermistor 16. Leads 128, 130 connect from the relay to an external data collector 132, e.g., a computer, which records each activation event of the self-heating thermistor (in order to derive T). The circuit is initially activated by a manual switch 134. A single 100 ma-rated ±15 volts regulated power supply may be used to operate the entire circuit.

OPERATION

The liquid metering process is initiated by pushbutton activation of a thermal pulse at $R_h$ (the self-heating thermistor). The $-4\%/°C$. temperature coefficient of the referenced Fenwall type GP38P12 heat sensing thermistor ($R_t$) produces a positive-going voltage at juncture A as the warm liquid pulse traverses the sensing zone. This signal is amplified at B and connected through capacitor 76 to the inverting input of amplifier 80 of the first stage differential amplifying circuit 74. This arrangement yields a pulse voltage output at C equivalent to the amplified inverted time derivative at B. Output at C is proportional to $dR_t/dt$ and thus slow temperature changes yield essentially zero response in contrast to heat pulses generated in situ by the self-heating thermistor.

A single derivative pulse output returns to baseline too slowly to be optimally prepared for subsequent pulses. Most preferably, therefore, an inverted second derivative is produced at the second stage amplifier 80a resulting in the approximate pulse output form shown in Inset D and which is proportional to $d^2R_t/dt^2$.

This voltage pulse form is amplified at E to drive the transistor triggered timing circuit that applies power to the reed relay. This relay supplies a +30 volt D.C. pulse for a fixed time interval (generally 0.1 to 1.0 second) to both the pulse counter (i.e., computer), and self-heating thermistor 16. Metering precision is improved through the use of a D.C. pulse form, as opposed to an A.C. voltage pulse to heat thermistor 16. The 2K ohm resistor 126 protects the self-heating thermistor from overheating damage as it tails into self-heating and reduced resistance. A calculated maximum of 113 mW of power is dissipated at $R_h$ during application of the +30 volts D.C. power, using the referenced Fenwall GB34P2 standard probe thermistor.

The rate of flow and/or total flow of the metered liquid is electronically computed based on the pulse data collected by the electronics, and by applying the following generic mathematical expression:

$$T = V_c/f + K$$

where:
T = time period between pulses (e.g., in seconds);
$V_c$ = calibrated cell volume constant (e.g., in cubic centimeters);
f = flow rate (e.g., in cubic centimeters per second); and
K = calibrated time constant (e.g., in seconds).

The values $V_c$ and K may be determined, e.g., by the exemplary flow cell calibration procedure described in Example 1. T is the pulse period data collected, whereas f is solved to derive the flow rate of the metered liquid. Since the value $V_c/f$ is shown to be characteristically linear with T over a wide flow rate range (see Example 1), the computation of f may be straightforwardly performed electronically; and by a chart recorder or other device displayed visually in any desired form, e.g., to display either or both the instantaneous or averaged flow rate, or to produce based on total pulse counter ($\Sigma T$), total flow of the metered liquid over any elapsed period of time.

EXAMPLE 1

Calibration

This Example describes a preferential calibration method suitable to determine the calibration constants $V_c$ and K. These constants are described with respect to a given flow cell, electronic circuit, and electronic settings. In this study, the flow cell is of a design in which the thermistors 16, 20 are set apart (in center-to-center spacing) approximately 1½ inches; and are used in conjunction with a flow channel 12 of approximately 1/16 inch in diameter. Timer 118 is set to produce 0.8 second pulse heating time; and potentiometer 60 is adjusted to provide a steady state 50 mV positive baseline voltage on which the positive-going voltage pulses of the heat sensing thermistor are imposed. The zero adjust biasing circuit 84 is adjusted to produce zero voltage at D during the absence of pulsing.

Apparatus used to calibrate the flow cell consists of a Constametric I pump from LDC Corporation. The pump withdraws liquid (water) from a chromatographic reservoir, and advances it at a preset rate of flow through, sequentially, a pressure gauge, pulse dampening coil, and ultimately the flow cell, using standard 1/16 inch O.D. chromatographic tubing to convey the liquid. The discharge from the flow cell is fed through a back pressure-applying capillary coil (3"×0.005" I.D. capillary) to a collection vessel. A timer is used with a high precision balance to verify liquid flow rates.

The data generated are complied in Table I, below, wherein: f is the averaged flow rate in cc/minute determined from the precision balance and timer; and T is the averaged time period in seconds between pulsing of the self-heating thermistor as determined from relay 124.

TABLE I

| Experiment Run Number | f cc/min | 1/f (seconds/cc) | T (seconds) |
|---|---|---|---|
| 1 | 5.30 | 11.321 | 1.1826 |
| 2 | 4.78 | 12.552 | 1.2384 |
| 3 | 4.25 | 14.118 | 1.3078 |
| 4 | 3.74 | 16.043 | 1.3987 |
| 5 | 3.20 | 18.750 | 1.5240 |
| 6 | 2.64 | 22.727 | 1.7020 |
| 7 | 2.125 | 28.235 | 1.9729 |
| 8 | 1.61 | 37.267 | 2.4327 |
| 9 | 1.06 | 56.604 | 3.3449 |

Knowing f and T from any two sets of data points, taken from Table I, the equation $T = V_c/f + K$ can be solved to yield the calibration constants $V_c$ and K, using simultaneous equation solving methods to determine the two unknowns. For the given flow metering system described, and using the Table I data, the calibrated cell volume $V_c$ is computed to be 0.048 cc; and the calibration constant K is computed to be 0.630 second. Hence, flow in cc/second is determined according to this flow cell, using the expression $$T_{sec} = (0.048 \, cc/f) + 0.630 \, sec.$$

Figure 4:
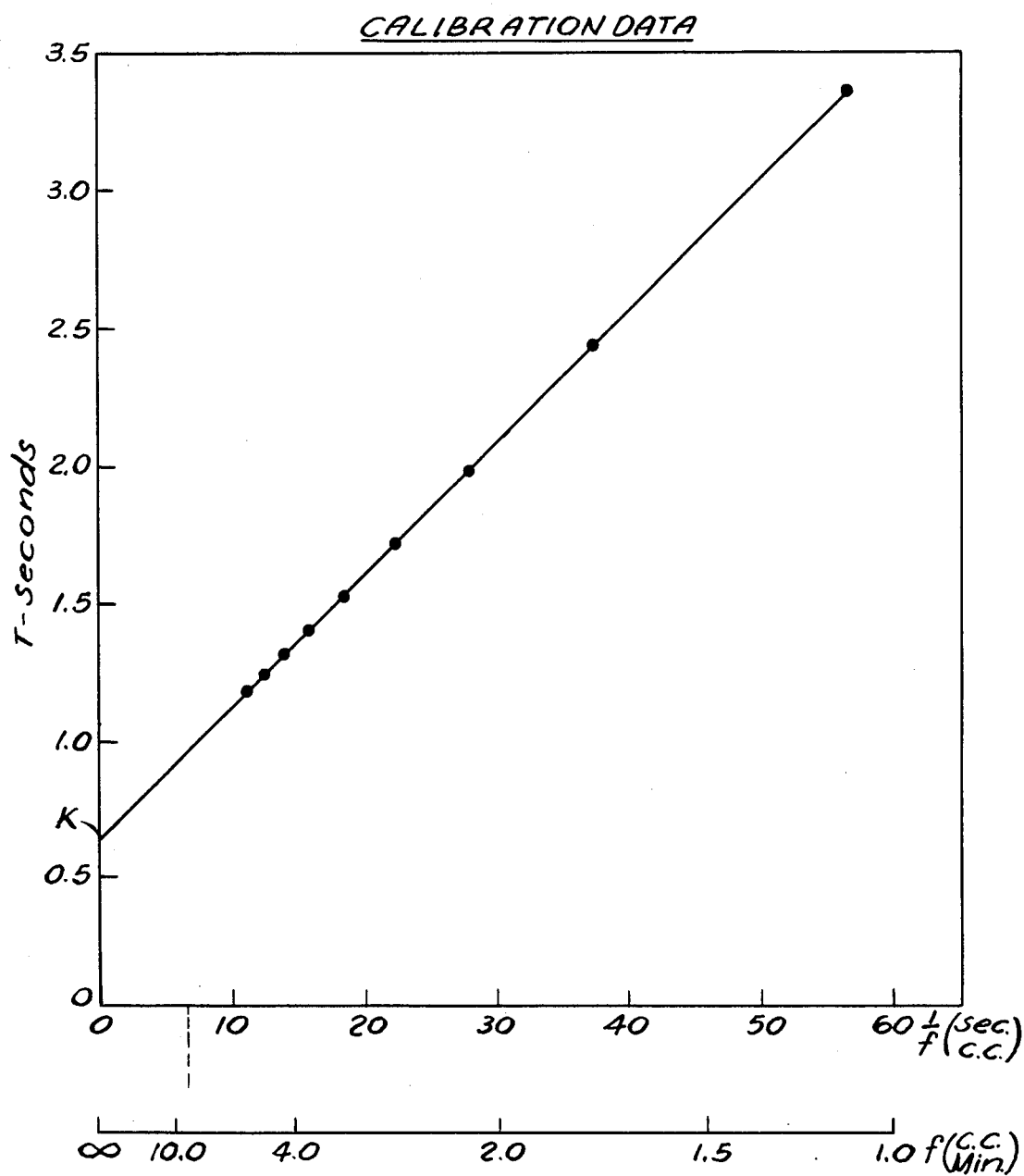
FIG. 4 is a graph associated with the calibration of the flow cell as described in Example 1.

The validity of the above equation is further established by making the plot illustrated as FIG. 4. The data points of multiple solutions to the equation at varying $T_{sec}$ and $f_{cc/min}$ produce the straight line (slope of $V_c$) which is projected to intercept the ordinate axis at the value K. Thus, the equation shows that the linear y = mx + b relationship is closely followed. The correlation coefficient for this data is calculated to be 0.99989.

Use of the mathematical basis described above to calibrate the flow cell constants produces exceptional liquid metering precision as shown in Example 2. Nevertheless, liquid flow may be alternatively measured using the flow cell with conventional calibration methods, e.g., by equating total pulse count and pulse frequency data, taken from relay 124, to preknown accumulated liquid volumes or flow rates, as applies. These latter calibration methods can be applied, for example, in order to use the flow cell for metering accurately non-Newtonian fluids.

EXAMPLE 2

Precision

The precision of an electronic flow cell of the same design as used in Example 1 is studied by connecting the cell to an elevated eluent reservoir through 5 feet of standard wall 1/16 inch O.D. chromatographic tubing. Liquid (water) is fed by gravity feed through the flow cell under a hydrostatic head pressure (total) of 6 inches of water. The water is dispelled ultimately to a collection vessel through tubing (also 1/16" O.D.) which has its end immersed in water in the collection vessel. Initial liquid flow is at approximately 1 cc/minute, and diminishes very slightly during the course of the experiment.

The time value of each pulse T produced at relay 124 is electronically stored in the memory bank of a MINC LSI-11 Microcomputer. At the completion of data collection, the computer electronically generates a linear regression curve and computes the standard deviation of T to be 2.973 milliseconds. Precision is calculated from the observed standard deviation to be 0.092% at the 63% confidence level (±1 sigma).

Since it is assumed that actual flow varied randomly (in very small amounts), due solely to the imperfect characteristics of the testing apparatus, observed precision is thus determined to be no worse than 0.092% in this experiment and quite likely true precision is better.

EXAMPLE 3

Range

The various flow cells used in this study essentially differ only in respect to calibrated cell volume ($V_c$). Flow cells Nos. 1 and 2 of Table II, below, are constructed using 24 and 12 inches, respectively, of 0.031 inch I.D. tubing which is connected between flow cell blocks each singularly mounting a thermistor. These are the relatively large volume cells. Cells Nos. 3 and 4 are smaller volume cells of the design shown in FIGS. 1 and 2; flow cell No. 3 being that used in the preceding Example 1. A variable liquid chromatographic metering pump is used to determine the dynamic flow range specific to each cell design, the observed results being reported in Table II.

TABLE II

| Flow Cell No. | K in seconds | $V_c/V_g$* in cc | Calculated Flow Range in cc/min | Observed T Average In Seconds @ Flow Range Limits |
|---|---|---|---|---|
| 1 | 0.687 | 0.492/0.424 | 9.84+ | 3.69 @ flow minimum |
| 2 | 0.689 | 0.219/0.225 | 4.56–11.0 | 3.63–1.88 |
| 3 | 0.630 | 0.048/0.075 | 1.05–5.30 | 3.34–1.18 |
| 4 | 0.653 | 0.017/0.025 | 0.20–2.17 | 5.72–1.12 |

*$V_g$ = geometric cell volume

The largest volume cell No. 1 shows a threshold (minimum) flow detection limit at about 10 cc/minute, its upper limit not being treated due to the limitations of the pumping apparatus used in the experiment. This flow cell demonstrates the feasibility of extending the liquid flow metering principles of the invention to the metering of considerably greater than 10 cc/minute flow rates.

Flow cells Nos. 1-3 collectively demonstrate the utility of the invention for metering liquid across essentially the entire practical scope of the sub-10 cc/minute flow range. This experiment is not intended to be construed to represent an optimization study of flow cell dynamic operating range as to any given cell design used in the experiment.

A point to be noted is that the K values determined for the various flow cells 1–4 are not identical. The slight discrepancies between the observed K values can probably be attributed to small differences in the electrical characteristics of the thermistors 16, 20 of each flow cell which, while of identical manufacturing source and part description, would be expected to vary slightly in thermal mass and/or electrical properties.

What is claimed is:

1. A method of non-invasive liquid metering to determine the volumetric flow rate of small quantities of a flowing liquid passing through a small elongate channel having a volume corresponding to a calibrated cell volume ($V_c$) of about 0.5 cc or less, the method comprising the steps of:
   (a) introducing a heat pulse into a flowing stream;
   (b) detecting the heat pulse downstream with a temperature sensitive element to produce an electrical sensor output;
   (c) electronically time differentiating the sensor output to reject slower ambient thermal drift and minimize response time in preparation for subsequent pulse detection, said time differentiating event producing an electrical signal which in magnitude is proportional to the second or a higher order time derivative of the sensor output;
   (d) using the time differentiated sensor output to trigger a subsequent heat pulse upstream;
   (e) repeatedly continuing steps (b), (c) and (d);
   (f) measuring the time intervals between successive pulses; and
   (g) determining the volumetric flow rate of the liquid through the elongate channel based on the measured time intervals between successive pulses.

2. The method of claim 1, including contacting the liquid with a heat emitting probe positioned within the channel to introduce said heat pulses, and contacting the liquid with a heat sensing probe positioned within the channel a fixed distance from the heat emitting probe to detect the heat pulses downstream.

3. The method of claim 2 wherein the heat emitting probe comprises a semiconductor element, and the heat sensing probe comprises a thermistor element.

4. The method of claim 3 wherein said probe elements are encased within an insulative cladding material.

5. Apparatus for metering sub-10 cc/minute volumetric liquid flow comprising:
   (a) a flow cell comprising a body means defining an elongate narrow channel;
   (b) a single electrical resistance heating means and a single companion electrical heat sensing means fixedly attached in cooperative relationship to the flow cell to alternately input and detect inputted heat pulses in liquid flowing through the channel;
   (c) an electrical circuit means to apply a voltage across the heat sensing means to produce a variable electrical analog signal corresponding to changes in the temperature of the electrical heat sensing means;
   (d) a differentiating circuit means for receiving the analog signal, differentiating this signal with respect to time and outputting a digital pulse signal corresponding to the arrival of each successive detected heat pulse, said differentiating circuit means comprising circuit means for producing an electrical signal which in magnitude is proportional to the second or a higher order time derivative of the variable electrical analog signal of the heat sensing means; (e) an off-on circuit means for applying a pretimed electrical voltage pulse to the resistance heating means responsive to each digital pulse outputted by the differentiating circuit means, whereby the operation of the electrical resistance heating means is triggered by each successive pulsing of the resistance heating means;
   (f) said elongate, narrow channel having a volume corresponding to a calibrated cell volume ($V_c$) which is about 0.5 cc or less.

6. The apparatus of claim 5 wherein the resistance heating means and companion heat sensing means comprise a heat emitting probe and a heat sensing probe positioned a fixed distance apart within the channel.

7. The apparatus of claim 6 wherein the heat emitting probe comprises a semiconductor element, and the heat sensing probe comprising a thermistor element.

8. The apparatus of claim 7 wherein said probe elements are encased within an insulative cladding material.

* * * * *

UNITED STATES PATENT AND TRADEMARK OFFICE
CERTIFICATE OF CORRECTION

PATENT NO. : 4,628,743

DATED : December 16, 1986

INVENTOR(S) : Miller, Jr. et al.

It is certified that error appears in the above-identified patent and that said Letters Patent is hereby corrected as shown below:

```
Column 2, line 52, delete "heat" and insert --heating--.
Column 4, line 29, delete "0.1" and insert --.01--.
Column 8, line 45, delete "GP38P12" and insert --GB38P12--.
Column 9, line 33, delete "counter" and insert --count--.
Column 11, line 38, delete "treated" and insert --tested--.
Column 12, Claim 5, line 35, delete "pl".
Column 12, Claim 5, line 49, delete "pl".
Column 12, Claim 7, line 64, delete "comprising" and
   insert --comprises--.
```

Signed and Sealed this

Twenty-second Day of September, 1987

Attest:

DONALD J. QUIGG

*Attesting Officer*   *Commissioner of Patents and Trademarks*